United States Patent [19]

Woo et al.

[11] Patent Number: 5,192,729

[45] Date of Patent: Mar. 9, 1993

[54] HIGHLY ACTIVE ZIEGLER-NATTA CATALYST FOR POLYMERIZING HDPE AND LLDPE AND METHOD FOR PREPARATION THEREOF

[75] Inventors: Seong I. Woo, Seoul; Il Kim, Kyungsangnam-Do, both of Rep. of Korea

[73] Assignee: Korea Advanced Institute of Science and Technology, Daejeon, Rep. of Korea

[21] Appl. No.: 773,512

[22] Filed: Oct. 9, 1991

[30] Foreign Application Priority Data

Oct. 10, 1990 [KR] Rep. of Korea ............... 16059/1990

[51] Int. Cl.$^5$ ..................... C08F 4/649; C08F 4/654
[52] U.S. Cl. ..................................... 502/104; 502/119; 502/122; 502/127; 526/124; 526/125
[58] Field of Search ................. 502/104, 119, 122, 127

[56] References Cited

U.S. PATENT DOCUMENTS 4,124,532  11/1978  Giannini et al. ................ 502/104 X
4,591,577   5/1986  Sato et al. ....................... 502/122 X

FOREIGN PATENT DOCUMENTS 0012147  3/1979  European Pat. Off. .
0012148  3/1979  European Pat. Off. .

OTHER PUBLICATIONS

The Condensed Chemical Dictionary, Fifth Edition (1956), POB by Reinhold Publishing Corp.

*Primary Examiner*—Patrick P. Garvin
*Attorney, Agent, or Firm*—Christie, Parker & Hale

[57] ABSTRACT

A highly active Ziegler-Natta catalyst for polymerizing HDPE and LLDPE at low temperature and pressure may be prepared by reacting a magnesium compound and a halogen compound with an electron donor compound to dissolve, reacting the resulting solution with a titanium compound to obtain the homogeneous solution and then adding a small quantity of surfactant to the homogeneous solution. Ethylene polymers and copolymers were prepared by activating the resulting catalyst to obtain the granular polymer having density of from 0.92 to 0.98 g/cm$^3$ and in which the particle size distribution was narrow.

22 Claims, No Drawings

HIGHLY ACTIVE ZIEGLER-NATTA CATALYST FOR POLYMERIZING HDPE AND LLDPE AND METHOD FOR PREPARATION THEREOF

BACKGROUND OF THE INVENTION

The present invention relates to a highly active Ziegler-Natta catalyst for polymerizing HDPE and LLDPE and a process for polymerizing HDPE (high density polyethylene) and LLDPE (linear low density polyethylene) having various physical properties at low temperature and pressure by activating the catalyst component with an organoaluminum compound.

The preparation of ethylene polymers and copolymers having high density and large melt indices is described in European patent publication Nos. 0012147 and 0012148. This prior art method requires high polymerization temperature and pressure to prepare such polymers, as well as, a high ratio of hydrogen/ethylene in the reactor in order to maintain the melt indices above 1.0 g/10 minutes. However, there is a drawback in that the activity of catalysts is decreased when polymerization temperature is above 90° C. and the ratio of hydrogen to ethylene becomes larger.

U.S. Pat. No. 4,124,532 discloses a process for polymerizing ethylene and propylene by using a highly active catalyst. The catalyst consists of complexes containing magnesium and titanium. The complexes are obtained by reacting metal chlorides such as $MgCl_2$ with electron donor compounds having the formula M'Y, in which M' is a metal such as Ti, and Y is a halogen or an organic radical. The resulting complexes are isolated into solids by crystallization involving evaporating the solvent in which the reaction is carried out, or by precipitation. Such isolated complexes are used to prepare polymerization catalysts by means of reacting the complexes with an organoaluminum compound. However, when the liquid phase complexes are isolated by crystallization or precipitation as disclosed in the above patent, the particles will be very heterogeneous, therefore, there is a disadvantage in that the particles of ethylene polymer and copolymer polymerized by the catalyst complexes will also be heterogeneous. Furthermore, the polymerization rate of such catalysts tends to decrease with time. Thus, there are disadvantages in that the mean polymerization rate or activity, (Kg polymers/g-titanium×hr) does not reach the desirable level and the optimum concentration of organic aluminum is high, in the case of long term polymerization. Further, the undesirable hydrogenation of ethylene tends to occur in the processes of polymerization forming ethane which accumulates in the reactor to consequently reduce the concentration of ethylene further decreasing the activity. U.S. Pat. No. 2,198,077 discloses that the liquid phase complex obtained in the manner as described in U.S. Pat. No. 4,124,532 was supported on the inert carrier such as silica to prepare the supported catalyst complex and the resulting catalyst complex was activated with an organoaluminum compound in the processes of polymerization and used in the gas phase polymerization for a fluidized bed-reactor. The particle shape of ethylene polymer and copolymer produced with such prepared catalyst are excellent, but the processes for preparing the catalyst are complicated, and their activity is too low to be polymerized at low pressure for the slurry reaction and also they require a large amount of an organoaluminum compound. Therefore, they are not suitable.

SUMMARY OF THE INVENTION

According to this invention, a homogeneous solution may be obtained by reacting compounds having the general formula $MX_2$, in which M is Mg, X is chloro or alkoxide radical, with a chloride of Lewis acid and an electron donor compound, and then the liquid phase complexes of the homogeneous solution may be prepared by adding titanium tetrachloride. In order to isolate such liquid phase complexes into the homogeneous size of catalyst particles, a small quantity of surfactant is added to the liquid complexes and then isolated into the homogeneous particles by precipitation with a suitable precipitant, and the resulting particles are purified and then dried. Such homogeneous particles (hereinafter, referred to as "catalyst precursor") are partially activated with an organoaluminum compound. When ethylene is polymerized or copolymerized in the slurry phase by such prepared catalyst completely activated with an organoaluminum compound in the polymerization reactor, the catalyst exhibits excellent stability with less undesirable hydrogenation of ethylene, so that high catalyst activity is maintained during polymerization time. Further, by addition of chlorides of Lewis acids, the catalyst activity is higher and the catalytically active sites are stable in spite of high polymerization temperatures. The resulting catalyst precursor also requires less organoaluminum compound while maintaining maximum activity, so that the HDPE and LLDPE can be prepared more economically. Furthermore, when homogeneous catalyst are used, the particles of ethylene polymer and copolymer produced one homogeneous.

DETAILED DESCRIPTION OF THE INVENTION

Ethylene Polymer and Copolymer

When only ethylene is polymerized without any comonomers, high density polyethylene having density of above 0.96 g/cm$^3$ is obtained.

A copolymer may be obtained by copolymerizing ethylene and small amount of alpha-olefin whose number of carbon is more than 4. The amount of alpha-olefin used in this invention may be changed in accordance with the kinds of alpha-olefin used, but ethylene copolymers prepared by copolymerizing various ratios of alpha-olefin and ethylene containg alpha-olefin from 1 to 5 mol %, preferably from 1 to 4 mol %, of total contents. Alpha-olefins useful in this invention are linear or branched olefins having 4 to 10 carbon atoms. Such olefins are, for example, 1-butene, 1-pentene, 1-hexene, 4-methyl-1-pentene, 1-octene, 1-decene or combination of these compounds. In particular, alpha-olefins having 4 to 8 carbon atoms may be preferred.

The densities of ethylene polymer and copolymer prepared according to this invention are within the range of from 0.92 to 0.98 g/cm$^3$ measured by the procedure of ASTM D-1505. If ethylene is polymerized while increasing the amount of comonomer, the density of polymer is reduced. The amount of alpha-olefin to obtain the same polymer density is changed according to the carbon number of alpha-olefin under the same polymerization condition. That is, in order to obtain the same Melt Flow Index (MFI) and density, the molar amount of alpha olefin to be contained in ethylene copolymer is decreased in the order of C4>C5>C6>C7>C8.

The MFI of ethylene polymer and copolymer prepared in this invention is within the range of from 0.0 to 100 g/min measure by the method of ASTM D-1238. When the MFI becomes larger, the processibility of ethylene polymer or copolymer will be increased. The desirable lower limit of MFI will be 10 g/min. On the contrary, when the MFI becomes smaller, the mechanical property is excellent. The desirable bottom limit of MFI is 0.1 g/min. The MFI of polyethylene may be changed according to the combination of the polymerization temperature, the density of the polymer, and the ratio of ethylene to hydrogen in the polymerization system. When the polymerization temperature is increased, the density of polymer is decreased. When the ratio of hydrogen/ethylene is increased, the MFI becomes larger. The molecular weight of ethylene polymer prepared by using the synthesized catalyst of this invention and the distribution of molecular weight thereof were measured at 135° C. by means of GPC method. The relationship between the decrease of number-average molecular weight ($\overline{Mn}$) and the partial pressure of hydrogen P ($H_2$) proposed by Natta can be shown as the following formula $$\overline{Mn} = 1/(K_1 + K_2 P(H_2))^{\frac{1}{2}},$$

in which $K_1$ is $1.1 \times 10^{-5}$ mol/g, $K_2$ is $3.02 \times 10^{-6}$ (mol/g × psi$^{-\frac{1}{2}}$). The dispersion of the polymer (Q-value) is in the range between 2.5 and 4.5. The degrees of crystallinity (X) of ethylene polymer and copolymer prepared by using catalyst prepared according to this invention was obtained from the following formula $$D = \rho c X + \rho a (1-X)$$

wherein D is density of a sample, $\rho c$ is density of polyethylene of crystalline region (1.014 g/cm$^3$), $\rho a$ is density of polyethylene of amorphous region (0.850 g/cm$^3$). When the polymerization was performed by using only ethylene and hydrogen, the degree of crystallinity was higher than 80%. When alpha-olefin is added, the degree of crystallinity decreased to 50–70%.

In order to know the thermal properties of ethylene polymer and copolymer prepared by the catalyst prepared according to this invention, differential scanning calorimetry (DSC) was performed. In order to measure the melting point with the DSC method, the temperatures of polymer samples were increased at the rate of 10° C./min to obtain a unique sharp peak between 100° C. and 140° C. Single and sharp melting point of the polymer indicates that ethylene polymer and copolymer prepared in accordance with this invention is homogeneous.

It is difficult to distribute alpha-olefins having low reactivity randomly because the reactivity of ethylene is much higher than that of alpha-olefins resulting in the block copolymer. However, alpha-olefin can be distributed randomly on the polymer chain by using the catalyst according to this invention in copolymerization.

Ethylene polymer and copolymer prepared by the catalyst prepared according to this invention can be used to produce various forms of articles by means of blow molding, injection molding, extrusion molding, etc. It is also suitable to prepare a film by means of the T-die method and an inflation method. Because ethylene polymer and copolymer produced using the catalyst and method, of this invention are classified by thermoplastic resins, they can be melted and mixed with other thermoplastic resins, such as polyethylene, polypropylene, copolymer of ethylene-vinylacetate and the like, and also with petroleum resins, waxes, stabilizing agents, anti-electrostatic agents, ultraviolet rays stabilizing agents, synthetic rubbers and natural rubbers, lubricants, inorganic reinforcing agents and the like. The ethylene polymers and copolymers prepared by the catalyst prepared according to this invention contain very small quantity of catalyst residues. When the polymerization activity of the catalyst is very high (>500 kg polymer/g-titanium × hr), the amount of titanium metal remaining in the polymer (or copolymer) after polymerization for 1 hour in the reactor is below 2 ppm. Thus, catalyst residues have no influences on the molded products and molding processes.

Component for the Preparation of Highly Active Catalyst

A class of the catalyst synthesized in accordance with this invention belongs to a Ziegler-Natta type catalyst and consists of component A, component B, and component C as follows:

(1) Component A

Component A is an organo metallic compound that is used as cocatalyst in this invention and which may be preferably selected from compounds of Group I to III metals of the Periodic Table that are well-known as the cocatalyst of a Ziegler-Natta type catalyst.

These organoaluminum compounds have the general formula, $$R'_{3-p}AlX'_p,$$

Where
R' is hydrogen or a hydrocarbon radical having from 1 to 20 carbon atoms, and more preferably from 1 to 6 carbon atoms;
X' is hydrogen, a halogen or a hydrocarbon radical based on alkoxy having from 1 to 20 carbon atom and, and more preferably from 1 to 6 carbon atoms. P is a value in the range of 0 to 2, preferably between 0 and 1.5. Examples of such organoaluminum compounds are as follows;

(A) trialkyl aluminums, such as trimethylaluminum, triethylaluminum, triisobutylaluminum, trioctylaluminum and tridecylaluminum;

(B) dialkyl-aluminum chlorides, such as chlorodiethylaluminum and chloro diisobutylaluminum;

(C) 1.5 alkyl-aluminum chlorides, such as 1.5-chloroethylaluminum;

(D) dialkyl aluminum hydrides, such as diethylaluminum hydride and diisobutyl aluminum hydride;

(E) dialkylaluminum alkoxy compounds, such as diethyl aluminum ethoxy compound, diethylaluminum butoxy compound and diethylaluminum phenoxy compound.

One or more organoaluminum compounds from (A) to (E) can be used. The organic aluminum compound of (A) may be preferred under the polymerization conditions of the temperature and pressure according to this invention, the compounds of (A) and (B) can also be mixed. There is no restriction on the amount of the organoaluminum compounds, to be used but atomic ratios of Al to the Ti of component B are preferred in the range of 10 to 200, and more preferred from 15 to 50.

(2) Component B

Component B is the product of the reaction of a magnesium compound which is defined as compound (a), a halogen compound which is defined as compound (b), a titanium compound which is defined as compound (c) and an electron donor compound which is defined as compound (d) as follows:

(a) magnesium compound

A suitable magnesium compound to be employed in this invention can be in either solid or liquid form.

Such magnesium compounds are, for example, (i) magnesium halides, such as magnesium chloride, magnesium bromide and magnesium iodide; (ii) halogeno hydrocarbyloxy magnesiums, such as chloromethoxy magnesium and chlorohydroxy magnesium; (iii) alkoxy magnesiums, such as ethoxy magnesium and methoxy magnesium; (iv) organomagnesium compounds, such as ethyl magnesium and chloroethyl magnesium and the like. The magnesium compounds of (i), (ii) and (iii) in above may be preferred, and magnesium chloride is especially preferred.

(b) halogen compound

A suitable halogen compound to be employed in this invention is any halogen compound containing a Group III to V element in either solid or liquid form.

Such halogen compounds are, for example, where X is a halide i) halogen compounds of a Group III elements, such as $BX_3$ and $AlX_3$; ii) halogen compounds of a Group IV elements, such as $CX_4$ and $SiX_4$; (iii) halogen compounds of a Group V elements, such as $PX_5$ and the like. $AlCl_3$ of (i), $SiCl_4$ of (ii) and $PCl_5$ of (iii) are especially preferred.

(c) titanium compound

A suitable titanium compound of this invention is selected from any one of titanium halides, halogen oxides, alkoxides and alkoxy halogen compounds.

Such compounds are, for example, (i) tetravalent titanium compounds, such as $TiCl_4$, $TiBr_4$, $Ti(OC_2H_5)Cl_3$, $Ti(O-n-C_4H_9)_3Cl$, $Ti(O-n-C_4H_9)_4$ and the like; and (ii) trivalent titanium compounds, such as $TiCl_3$, $TiBr_3$, $Ti(OC_2H_5)Cl_2$ and the like. The liquid phase of $TiCl_4$ in above may be suitable to be prepared the highly active catalyst in the same manner as this invention, but the desirable results can be obtained by the mixture of the compound of (i).

(d) electron donor compound

An electron donor compound must be liquid at room temperature and dissolve the compounds which are defined in the above (a), (b) and (c). Such electron donor compounds are known as Lewis bases. The examples of suitable electron donor compounds were described in detail in Europe patent publication No. 0055605. Principally, these are organic compounds of ester, ether and ketone.

Such electron donor compound may be preferred as follows; (i) alkylesters of saturated carboxylic aliphatic acids having from 1 to 4 carbon atoms and alkylesters of carboxy aromatic acids having from 7 to 8 carbon atoms; (ii) aliphatic ethers having from 2 to 8 carbon atoms and aromatic ethers having from 3 to 4 carbon atoms; (iii) aliphatic ketones having from 3 to 6 carbon atoms and the like.

Methyl formate, ethyl acetate, butyl acetate, ethyl ether, hexyl ether, tetrahydrofuran, dioxane, acetone, methyl ketone and the like in above may be especially preferred. The most preferred one is tetrahydrofuran having excellent reactivity with the compound which is defined at (a), (b) and (c).

The electron donor compounds as defined above can be used individually, or in a mixture with desirable effects.

(3) Component C

Component C is an anionic surfactant of sulfonates:

The compounds of sulfonates used as a surfactant in this invention are alkylbenzene sulfonates, naphthalene sulfonates, petroleum sulfonates, or sulfonic acids and sulfone salts, such as sulfonate having ester, ether, or amide bond. These surfactants can be used individually or as a mixture. The amount of these surfactants to be used is from 2 to 20% by weight, especially from 5 to 10% by weight, relative to the magnesium of component B. The dispersion of metal component contained in this homogeneous solution is excellent, yielding a homogeneous particle size distribution of catalyst.

Quantitative Ratio of Each Component

Quantitative ratios of each component is this invention can be varied to obtain the preferable results. The molar ratio of Mg to Ti ratio of the compound (a) and the compound (c) in the component B may be preferred generally from 0.5 to 50, more especially from 1 to 10. Further, the ratio of the compound (b) to the compound (a) in the component B may be preferred from 0.1 to 20, especially from 0.5 to 5.

Preperation of Highly Active Catalyst

A catalyst composition of this invention consists of a homogeneous solution obtained by reacting a magnesium compound, a halogen compound of a temperature and a titanium compound with an electron donor compound from between room temperature (25° C.) to the boiling point of the electron donor compound. Vigorous stirring is preferred. If the homogeneous solution is obtained by completely dissolving the magneisum compound, the halogen compound and the titanium compound in the electron donor compound, the surfactant, component C is added to the solution mixture. The catalyst precursor, a solid powder can be isolated from this homogeneous solution at the temperatures from −50° to 25° C. by evaporating the electron donor compound, or by precipitation with aliphatic or aromatic hydrocarbons having from 5 to 8 carbon atoms, such as hexane, isopentane and benzene, as the precipitant. To completely dry the catalyst precursor powder without thermal degradation the particles are contacted with a flowing inert gas at 60° C. or evacuated at the vacuum of 10-20 mmHg. The yellow homogeneous particles having diameters of 5 to 20$\mu$ and narrow distribution of particle size are obtained after drying and are of generally round shape. The sizes and the distribution of particles have an influence on copolymerization of ethylene and alpha-olefin. That is, when the particle size is not uniform, the distribution of alpha-olefin in the polymer chain is not homogeneous, and it is difficult to obtain the copolymer with excellent homogeneity. The unique melting point of copolymer prepared by the synthesized catalyst of this invention is related to small size and narrow size distribution of catalyst particles.

Activation of a Prepared Catalyst

In order to use the catalyst as prepared above in the polymerization and copolymerization of ethylene, the catalyst must be activated by an organoaluminum compound of component A.

The activation may be performed by two methods. First, the catalyst as prepared above may be completely activated just before polymerization. Second, the catalyst as prepared above may be partially activated by the organoaluminum compound and then completely activated just before polymerization. The second method may be more effective as the amount of the electron donor compound having a detrimental influence on the activity during polymerization can be reduced by reacting the electron donor compound with the organoaluminum compound.

Partial activation may be carried out by adding the organoaluminum compound dropwise to the catalyst of slurry phase prepared in the hydrocabon solvent, and wherein the Al to Ti ratio may be 10:1, preferably from 4:1 to 8:1. The properties of the catalyst particles in the process of partial activation do not change significantly, out the color changes from yellow to brown. After drying at the temperature from room temperature up to the boiling point of the solvent in the flow of an inert gas or under vacuum to remove the hydrocarbon solvent from the precipitate, the brown homogeneous catalyst particles in which the particle size distribution having particle diameters from 5 to 50$\mu$, may be obtained.

When the partially activated catalysts were employed in polymerization, the catalysts must be completely activated before polymerization. The amount of the organoaluminum introduced into the reactor may be from 10 to 200, preferably in a ratio of Al to Ti from 15 to 50.

Polymerization

The catalyst systems prepared according to this invention may be applicable to the typical slurry phase polymerization as well as a liquid polymerization without solvent, a solution polymerization or a gas phase polymerization. In case of the slurry phase polymerization, a saturated aliphatic or aromatic hydrocarbon, such as, hexane, heptane, pentane, cyclohexane, benzene and toluene and preferably hexane and heptane, considering the economical and chemical point of view, are used as a solvent.

The polymerization temperature may be comprised between room temperature and 200° C., preferably between 50° and 90° C. Hydrogen may be used as molecular weight regulators.

The following examples are given to illustrate the invention and are not intended to be limited.

EXAMPLE 1

Preperation of Catalyst and Polymerization of Ethylene 5.72 g (50 mmol) of anhydrous magnesium chloride were put into a flask under a nitrogen atmosphere and 175 ml (2.15 mol) of tetrahydrofuran were slowly added therein. After magnesium chloride was completely dissolved, 4.00 g (30 mmol) of anhydrous aluminum chloride ($AlCl_3$) were slowly added and reacted for 15 minutes to obtain the homogeneous solution. 3.16 g (16.67 mmol) of titanium chloride were added dropwise to the solution and dissolved. The temperature of the solution was raised up to the boiling point of tetrahydrofuran and then reacted for 1 hour under reflux. 0.5 g of Emasol S-20 surfactant were added to this mixture and stirred for 30 minutes. The color of the resulting liquid mixture is bright yellow. After the homogeneous solution was cooled to −20° C., an excess of hexane was slowly added to the solution to form bright yellow fine particles. Then, the supernatant liquid was carefully poured out and the remainder was filtered by using a spacular filter (the clearance size: 2 to 4) under nitrogen atmosphere. The resulting precipitate was put into a rotary drier and dried for 12 hours in the slowly flowing nitrogen under vacuum of 15 mmHg at 60° C. to provide fine particles of narrow size distribution. The content of titanium contained in the catalyst component is 3.2% by weight. After this catalyst was brought into the flask filled with nitrogen and then hexane was added so as to have a slurry phase. Triethylaluminum was diluted with hexane, to 10% by weight, so the Al to Ti ratio was 3, and added dropwisely for 30 minutes to provide a yellowish brown solid. The resulting precipitate was put into the rotary drier and dried for 12 hours in slowly flowing nitrogen under vacuum of 15 mmHg at 60° C. and kept under nitrogen atmosphere until it was used in the polymerization reaction. The content of titanium in the catalyst component is 2.3% by weight.

In order to prepare ethylene polymer (high density polyethylene) and copolymer (linear low density polyethylene) using the catalyst prepared in this invention, the slurry phase polymerization may be carried out in a high pressure stainless steel reactor, which was equipped with a stirrer and a temperature regulator. The inner volume of the reactor is 1 liter. The process will be described in the following. The polymerization procedure described in this invention may be similar to the typical slurry phase polymerization.

Preparation of HDPE 0.5 liter of hexane, in which moisture and oxygen were removed, and 38.9 mg of triethylene aluminum were introduced into the reactor at room temperature. After the temperature was raised to 70° C., ethylene was introduced by 3 kg/$cm^3$ to be saturated in hexane. When ethylene was completely saturated in hexane to reach an equilibrium, 10 mg of catalyst was added to initiate polymerization and the polymerization was continued for 1 hour. When the polymerization was completed, the introduction of ethylene was interrupted and then the temperature of the reactor was lowered to room temperature. The resulting HDPE was isolated by filtration and dried. The other HDPE's were prepared in the same manner as mentioned above with the same apparatus except for the polymerization conditions as shown in Table 1.

Preparation of LLDPE 0.5 liter of hexane, in which moisture and oxygen were removed, 67 g of 1-hexene and 38.9 mg of triethyl aluminum were introduced into the reactor at room temperature. After the temperature was raised to 70° C., ethylene was introduced by 3 kg/$cm^3$ to be saturated in hexane. When ethylene was completely saturated in hexane to reach an equilibrium, 10 mg of catalyst was added to initiate polymerization and the polymerization was continued for 1 hour. When the polymerization was completed, the introduction of ethylene was interrupted and then the reactor temperature was lowered to room reactor temperature. The resulting LLDPE was isolated by filtration and dried. The other LLDPE's were prepared in the same manner as mentioned above except for the polymerization conditions as shown in Table 1.

COMPARATIVE EXAMPLE 1

A catalyst may be prepared in the same manner as described in Example 1, with the exception of using 50 mmol of ethoxy magnesium instead of magnesium chloride and increasing from 30.00 mmol of aluminum chloride to 250 mmol. The content of titanium contained in the resulting catalyst is 1.76% by weight. Ethylene polymerization was performed with this catalyst to obtain the results as shown in Table 1.

EXAMPLE 2

A catalyst may be prepared in the same manner as described in Example 1, with the exception of using 30.00 mg of $SiCl_4$ instead of $AlCl_3$. The content of titanium contained in the resulting catalyst is 0.42% by weight. Ethylene polymerization and ethylene copolymerization using 1-hexene and 1-butene as comonomers were performed using this catalyst to obtain the result as shown in Table 1.

COMPARATIVE EXAMPLE 2

A catalyst may be prepared in the same manner as described in Example 2, except without use of the surfactant. An excess amount of hexane was added at room temperature to the homogeneous solution obtained before adding the surfactant to form a bright yellow slurry of fine particles. Then, the supernatant liquid was carefully poured out and filtered under nitrogen atmosphere. The resulting precipitate was put into the rotary drier and dried for 12 hours at 15 mmHg and 60° C. under slowly flowing nitrogen to obtain granular particles of irregular size and shape. Such solid particles were brought into the flask filled with nitrogen and then diluted with hexane, to 10% by weight, so as to have a slurry phase. The catalyst was partially activated by adding 15 wt % hexane solution of triethyl aluminum dropwisely for 10 minutes to obtain a yellowish brown solid. The resulting precipitate was brought into the rotary drier and dried for 12 hours at 15 mmHg and 60° C. and under slowly flowing nitrogen then stored under nitrogen until it was used in the polymerization. The content of titanium in the catalyst is 2.46% by weight. Ethylene polymerization was performed with this catalyst under the same polymerization conditions as Example 2 as shown in Table 1.

EXAMPLE 3

A catalyst may be prepared in the same manner as described in Example 1, with the exception of using 30.00 mmol of phosphorous chloride instead of aluminum chloride. The content of titanium contained in the resulting catalyst is 2.38% by weight. Ethylene polymerization and copolymerization were performed by using the catalyst prepared in the same manner as described in comparative Example 1 to obtain the results as shown in Table 1.

COMPARATIVE EXAMPLE 3

A catalyst may be prepared in the same manner as described in Example 3, except without the partial activation, as performed in Example 3. The surfactant was added and then precipitated with hexane, and stored under nitrogen atmosphere until it was used in polymerization. 3.27% by weight of titanium was contained in the resulting catalyst of yellow fine particles. The results of ethylene polymerization and copolymerization using this catalyst were shown in Table 1.

EXAMPLE 4

A catalyst may be prepared in the same manner as described in Example 1, with the exception of using 30.00 mmol boron chloride instead of the aluminum chloride used in Example 1 as the halogen compounds. The content of titanium contained in the resulting catalyst is 2.62% by weight. The results of ethylene polymerization and copolymerization using this catalyst were shown in Table 1.

COMPARATIVE EXAMPLE 4

A catalyst may be prepared in the same manner as described in Example 4 with the exception of using boron chloride as the halogen compound used in Example 4. 16.67 mmol of titanium chloride were added dropwisely for 30 minutes to a colorless transparent homogeneous solution obtained by reacting 50 mmol of anhydrous magnesium chloride and 175 ml of tetrahydrofuran to provide a bright yellow transparent homogeneous solution. The temperature of the solution was raised up to the boiling point of tetrahydrofuran and then reacted for 1 hour under reflux. 0.5 g of Emasolo S-20 surfactant were added to this mixture and the resulting mixture was stirred for 30 minutes, then, after the temperature of the reactant was reduced to −20° C., an excess of hexane was slowly added to the solution to form bright yellow fine particles. The catalyst components were dried, and then partially activated by triethylaluminum for Al/Ti ratio to be 3, to obtain a yellowish brown solid. The resulting solid was filtered, dried and then stored under nitrogen atmosphere until it was used in the polymerization. The content of titanium contained in the catalyst components is 3.2% by weight. The results of ethylene polymerization and copolymerization using the resulting catalyst were shown in Table 1.

TABLE 1

| | Physical properties of HDPE and LLDPE and Activity of polymerization and copolymerization | | | | | | | | |
|---|---|---|---|---|---|---|---|---|---|
| Examples | Type of polymerization | Kinds of copolymerization | Amount of Co-monomer charged | Co-monomer ethylene (mole ratio) | Polymerization activity Kg polymer / g Ti x time | Density (g/ml) | Crystallization degree (%) | Density (g/ml) | Type of Polymer |
| Ex. 1 | polymerization | — | — | — | 520 | 0.972 | 80.8 | 0.41 | HDPE |
| " | copolymerization | 1-hexene | 67 | 1.89 | 372 | 0.921 | 46.8 | 0.33 | LLDPE |
| " | copolymerization | 1-butene | — | 0.067 | 402 | 0.923 | 49.8 | — | LLDPE |
| Comparative Ex. 1 | polymerization | — | — | — | 263 | 0.964 | 75.9 | 0.32 | HDPE |
| Ex. 2 | polymerization | — | — | — | 616 | 0.976 | 83.2 | 0.39 | HDPE |
| " | copolymerization | 1-hexene | 67 | 1.89 | 482 | 0.931 | 55.1 | 0.32 | LLDPE |
| Ex. 2 | copolymerization | 1-butene | — | 0.067 | 489 | 0.927 | 52.4 | | LLDPE |
| Comparative Ex. 2 | polymerization | — | — | — | 584 | 0.969 | 80.0 | 0.33 | HDPE |

TABLE 1-continued

Physical properties of HDPE and LLDPE and Activity of polymerization and copolymerization

| Examples | Type of polymerization | Kinds of copolymerization | Amount of Co-monomer charged | Co-monomer ethylene (mole ratio) | Polymerization activity Kg polymer / g Ti x time | Density (g/ml) | Crystallization degree (%) | Density (g/ml) | Type of Polymer |
|---|---|---|---|---|---|---|---|---|---|
| Ex. 3 | polymerization | — | — | — | 472 | 0.969 | 80.0 | 0.37 | HDPE |
| " | copolymerization | 1-hexene | 67 | 1.89 | 308 | 0.934 | 57.0 | | LLDPE |
| Comparative 3 | polymerization | — | — | — | 394 | 0.967 | 77.8 | 0.37 | HDPE |
| Ex. 4 | polymerization | — | — | — | 242 | 0.969 | 80.0 | 0.39 | HDPE |
| " | copolymerization | 1-hexene | 67 | 1.89 | 173 | 0.938 | 59.6 | 0.31 | LLDPE |
| Comparative 4 | polymerization | — | — | — | 228 | 0.971 | 80.2 | 0.37 | HDPE |

As shown in Table 1 the catalyst of this invention may be characterized by high activity that provides excellent polymerization and copolymerization by adding halogen compound (comparison of Ex. 1, Ex. 2, Ex. 3 Ex. 4, the with comparative Ex. 4) and bulk density of the polymer prepared by adding the surfactant is also high (comparison of Ex. 2 with comparative Ex. 2). Further, if the polymerization was performed by using alpha-olefin as copolymer, LLDPE having low density, can be prepared as shown in Ex. 1, Ex. 2, Ex. 3 and Ex. 4.

What is claimed is:

1. A highly active Ziegler-Natta catalyst for ethylene polymerization, comprising:
   a catalyst precursor obtained by reacting a magnesium compound, a halogen compound, and a titanium compound with an electron donor compound, wherein the molar ratio of magnesium to titanium is between 1 and 10, and the molar ratio of halogen to magnesium is between 0.5 and 5;
   a surfactant in an amount of between 5% and 10% by weight of the magnesium compound; and
   an organoaluminum compound for partially activating the catalyst, the organoaluminum compound being present in an amount such that the molar ratio of aluminum to titanium is between 1 and 10.

2. The catalyst according to claim 1 wherein said magnesium compound is selected from the group consisting of magnesium chloride, dialkoxy magnesium, chloroalkoxy magnesium and chlorohydroxy magnesium.

3. The catalyst according to claim 1, wherein said titanium compound is TiCl$_4$.

4. The catalyst according to claim 1, wherein said halogen compound is selected from the group consisting of BCl$_3$, AlCl$_3$, SiCl$_4$ and PCl$_5$.

5. The catalyst according to claim 1 wherein the surfactant is selected from the group consisting of sulfonic acids and sulfone salts.

6. The catalyst according to claim 5 wherein the surfactant is selected from the group consisting of alkylbenzene sulfonate, naphthalene sulfonate, petroleum sulfonate, and sulfonate having an ester, ether or amide bond.

7. A method for the preparation of highly active Ziegler-Natta catalyst for ethylene polymerization comprising the steps:
   combining a catalyst precursor with an organoaluminum compound to activate the catalyst precursor, said catalyst precursor prepared by the steps comprising:
   reacting a magnesium compound, a halogen compound and a titanium compound with an electron donor compound to obtain a homogeneous solution;
   adding a surfactant;
   stirring;
   adding an excess of precipitants;
   filtering; and
   drying to form solid particles of catalyst.

8. A method according to claim 7 wherein the magnesium compound is selected from magnesium chloride, dialkoxy magnesium, chloroalkoxy magnesium and chlorohydroxy magnesium.

9. A method according to claim 7 wherein the titanium compound is TiCl$_4$.

10. A method according to claim 9 wherein the amount of TiCl$_4$ is from 1 to 10 as the Al to Ti ratio.

11. A method according to claim 7 wherein the halogen compound is a compound of Group III to V elements.

12. A method according to claim 11 wherein the compound of Group III to V elements is selected from BCl$_3$, AlCl$_3$, SiCl$_4$ and PCl$_5$.

13. A method according to claim 11 wherein the amount of the halogen compound is from 0.5 to 5 as the ratio of halogen compound to magnesium compound.

14. A method according to claim 7 wherein the electron donor compound is selected from alkylesters of saturated carboxy aliphatic acids with between 1 and 4 carbon atoms or alkylesters of carboxy aromatic acids with between 7 and 8 carbon atoms, aliphatic ethers with between 2 and 8 carbon atoms or aromatic ethers with between 3 and 4 carbon atoms and aliphatic ketones with between 3 and 6 carbon atoms.

15. A method according to claim 7 wherein the reaction temperature is from room temperature to the boiling point of the electron donor compound.

16. A method according to claim 7 wherein the surfactant component is selected from sulfonic acids and sulfone salts.

17. A method according to claim 16 wherein the amount of the surfactant component is added from 5 to 10% by weight of the magnesium compound.

18. A method according to claim 16 wherein the surfactant is selected from the group consisting of alkylbenzene sulfonate, naphthalene sulfonate, petroleum sulfonate, and sulfonate having an ester, ether or amide bond.

19. A method according to claim 7 wherein the solid particles of the catalyst component are isolated by the precipitant selected from aliphatic or aromatic hydrocarbons having from 5 to 8 carbon atoms.

20. A method according to claim 19 wherein the temperature of the homogeneous solution is from −50° C. to room temperature, upon isolating the solid particles.

21. A method according to claim 7 wherein the isolated catalyst component is partially activated by the organic aluminum compound having the general formula:

$$Al(R')_a X'_b H_c$$

wherein X' is Cl, R' is saturated hydrocabon radical containing from 1 to 14 carbon atoms, b is 0 to 1.5, c is 0 or 1, and a+b+c=3.

22. A method according to claim 21 wherein the partial activation is carried out as Al to Ti molar ratio of from 4 to 8, of the amount of the organoaluminum compound.

* * * * *